United States Patent
Fujita (10) Patent No.: US 8,878,946 B2
(45) Date of Patent: Nov. 4, 2014

(54) IMAGE PROCESSING APPARATUS AND CONTROL METHOD THEREFOR

(75) Inventor: Atsushi Fujita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 645 days.

(21) Appl. No.: 13/173,186

(22) Filed: Jun. 30, 2011

(65) Prior Publication Data

US 2012/0019678 A1 Jan. 26, 2012

(30) Foreign Application Priority Data

Jul. 22, 2010 (JP) ................................. 2010-165345

(51) Int. Cl.
*H04N 5/228* (2006.01)
*H04N 5/235* (2006.01)
*H04N 5/232* (2006.01)

(52) U.S. Cl.
CPC ....... *H04N 5/23254* (2013.01); *H04N 5/23277* (2013.01); *H04N 5/23245* (2013.01)
USPC ................ 348/208.13; 348/222.1; 348/221.1

(58) Field of Classification Search
CPC .................................................. H04N 5/2354
USPC .................................................... 348/208.13
See application file for complete search history.

(56) References Cited

U.S. PATENT DOCUMENTS 6,205,259 B1 *  3/2001  Komiya et al. ............... 382/284
8,248,480 B2 *  8/2012  Matsunaga et al. ........ 348/218.1
8,525,904 B2 *  9/2013  Mitsuya et al. ............... 348/241
8,558,944 B2 * 10/2013  Makii ............................ 348/362
2008/0291285 A1 * 11/2008  Shimizu ..................... 348/208.6

FOREIGN PATENT DOCUMENTS

| JP | 08-307761 | 11/1996 |
|---|---|---|
| JP | 2000-224470 | 8/2000 |
| JP | 2011-239266 A | 11/2011 |

OTHER PUBLICATIONS

The above reference was in a Apr. 4, 2014 Japanese Office Action, a copy of which is enclosed without an English Translation, that issued in Japanese Patent Application No. 2010-165345.

* cited by examiner

*Primary Examiner* — Ahmed A Berhan (74) *Attorney, Agent, or Firm* — Cowan, Liebowitz & Latman, P.C.

(57) ABSTRACT

An image processing apparatus sets one of a plurality of obtained images as a reference image, and detects a motion vector relative to the reference image for the other images. A scalar amount of the detected motion vector is compared with a threshold value representing an image displacement limit for combining an image with the reference image, and whether a condition for combining with the reference image is satisfied is determined. If the condition is satisfied, a corresponding image is moved to cancel the detected motion vector and combined with the reference image, and an image in which displacement between images has been corrected is output. The threshold value is changed by a control unit depending on an image-capturing setting set when the plurality of images are captured, the condition of an object image in the plurality of captured images, or the like.

21 Claims, 3 Drawing Sheets

IMAGE PROCESSING APPARATUS AND CONTROL METHOD THEREFOR

BACKGROUND OF THE INVENTION

1. Field of the Invention

The present invention relates to a technique for using a plurality of images to correct displacement between the images and combining the images.

2. Description of the Related Art

These days, image-capturing apparatuses such as digital cameras often include various camera shake correction functions in order to prevent blurring of an object image that occurs as a result of movement of the image-capturing apparatus due to camera shake caused by the user at the time of image capturing, or the like. There are two main types of camera shake correction functions, namely, optical camera shake correction and electronic camera shake correction. In electronic camera shake correction, displacement of an object image is corrected through image processing on a plurality of captured images. Specifically, in electronic camera shake correction, the positions of object images having the same pattern are detected in each of a plurality of images that have been obtained by performing image capturing a plurality of times, and the position where the plurality of images are to be combined is adjusted such that the object images having the same pattern mutually overlap.

Such camera shake correction function is effective for image capturing in a dark place such as a night scene, for example. With image capturing in a dark place such as a night scene, a method is employed in which the light-receiving sensitivity of the image sensor is increased in order to achieve proper exposure, although because noise is noticeable in the captured image, another method is also employed in which the exposure time is increased so as to reduce noise and achieve proper exposure. However, as a result of increasing the exposure time, image capturing is susceptible to the effect of camera shake caused by the person who holds the image-capturing apparatus during the exposure time. In such a situation, by using electronic camera shake correction, for example, it becomes possible to reduce noise in a plurality of images captured with a short exposure time and obtain an image in which camera shake has been corrected.

It is desirable to combine images such that the object images having the same pattern in the images mutually overlap when the electronic camera shake correction is performed. However, in the case where the pattern matching is difficult such as, for example, when the amount of camera shake is too large, or when the image is not focused, it is not possible to correctly detect the displacement amount of the object images. That is, it has not been possible for a person to obtain the image that he or she desires, if images for which the displacement amount of the object images has been erroneously detected are combined.

Japanese Patent Laid-Open No. 8-307761 discloses a method in which, in order to avoid not obtaining a desired image as a result of combining images for which the displacement amount of object images has been erroneously detected, only images captured under proper exposure conditions are extracted and combined out of a plurality of captured images. Also, Japanese Patent Laid-Open No. 2000-224470 discloses a method in which since the displacement amount of object images is likely to be large when the exposure time is long, a plurality of images that have been captured during an exposure time that is less than or equal to a predetermined period of time are combined.

Figure 4A:
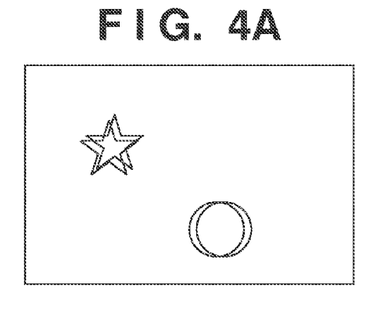
FIGS. 4A and 4B are diagrams illustrating double images.

In the case where electronic camera shake correction is performed in a bright scene having sufficient illumination, rather than image capturing in a dark place as described above, it is possible to obtain object images having a high edge contrast in each of a plurality of captured images. However, if an image for which the displacement amount of the object image has been erroneously detected is present in the case where the electronic camera shake correction is performed by using these images having a high edge contrast, a so-called double image as shown in FIG. 4A, in which a plurality of object images appear to overlap each other, may occur in the image obtained by combining the images. In particular, in the case where images to be combined are selected and only a small number of images are combined, as in Japanese Patent Laid-Open No. 8-307761, the double image is highly noticeable if it occurs.

SUMMARY OF THE INVENTION

The present invention has been made in view of issues present in conventional techniques as described above. The present invention provides suppressing generation of an image for which the displacement between object images is noticeable as a result of a plurality of images being combined.

The present invention in its first aspect provides an image processing apparatus comprising: an image obtaining unit configured to obtain a plurality of images; a setting unit configured to set one of the plurality of images obtained by the image obtaining unit as a reference image; a detection unit configured to detect, with respect to each of the plurality of images excluding the reference image, a motion vector relative to the reference image; a determination unit configured to compare, with respect to each of the plurality of images excluding the reference image, a scalar amount of the motion vector detected by the detection unit with a threshold value representing an image displacement limit for combining an image with the reference image, and, if the scalar amount of the motion vector is less than or equal to the threshold value, determine that a condition for combining with the reference image is satisfied; a combining unit configured to move an image for which the determination unit has determined that the condition for combining with the reference image is satisfied so as to cancel the motion vector of the image, and combine the image with the reference image; and a control unit configured to change the threshold value.

Further features of the present invention will become apparent from the following description of exemplary embodiments (with reference to the attached drawings).

DESCRIPTION OF THE EMBODIMENTS

Embodiments of the present invention will be described in detail below with reference to the attached drawings. Note that in the embodiments described below, an example in which the present invention is applied to a digital camera, which serves as an example of the image processing apparatus, capable of outputting an image obtained by correcting displacement between a plurality of captured images and combining the images is described. However, the present invention can be applied to any apparatus capable of outputting an image obtained by correcting displacement between a plurality of obtained images and combining the images.

Figure 1:
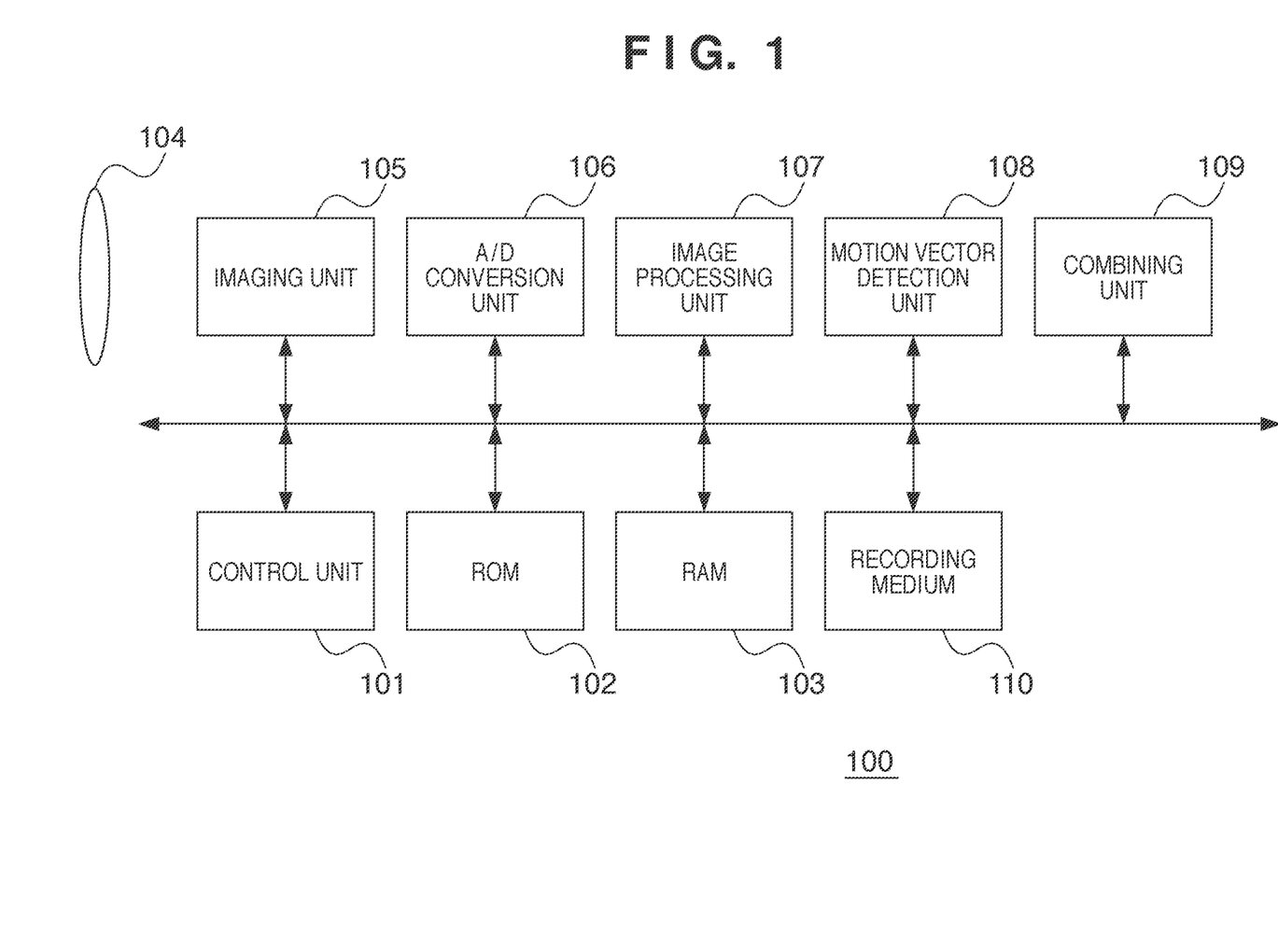
FIG. 1 is a block diagram illustrating the functional configuration of a digital camera according to an embodiment of the invention.

FIG. 1 is a block diagram illustrating the functional configuration of a digital camera 100 according to an embodiment of the present invention.

A control unit 101 is a CPU, for example, and reads out operation programs for the blocks included in the digital camera 100 from a ROM 102, expands the programs in a RAM 103 and executes the programs, thereby controlling the operation of the blocks included in the digital camera 100. The ROM 102 is a rewritable non-volatile memory, and stores parameters and the like necessary for the operation of the blocks included in the digital camera 100, such as the division number of the image, in addition to the operation programs for the blocks. The RAM 103 is a rewritable volatile memory, and is used as a temporary storage region for data that is output in the operation of the blocks included in the digital camera 100. The RAM 103 of the present embodiment temporarily stores a plurality of images that are captured in order to perform camera shake correction.

An imaging unit 105 is an image sensor such as a CCD sensor or CMOS sensor, and photoelectrically converts an optical image formed on the image sensor by an optical system 104 and outputs obtained analog image signals to an A/D conversion unit 106. The A/D conversion unit 106 performs A/D conversion processing on the input analog image signals, and outputs the obtained digital image data to an image processing unit 107. The image processing unit 107 performs predetermined image processing such as color tone correction, gain adjustment or the like on the input digital image data, and stores the resultant data in the RAM 103. Note that the image capturing processing performed by the imaging unit 105, the A/D conversion unit 106 and the image processing unit 107 is repeatedly executed a predetermined number of times or for a predetermined period of time, in the case where the user has selected capturing images with performing electronic camera shake correction, for example. In this case, a plurality of images output each time image capturing is performed are temporarily stored in the RAM 103.

Figure 3:
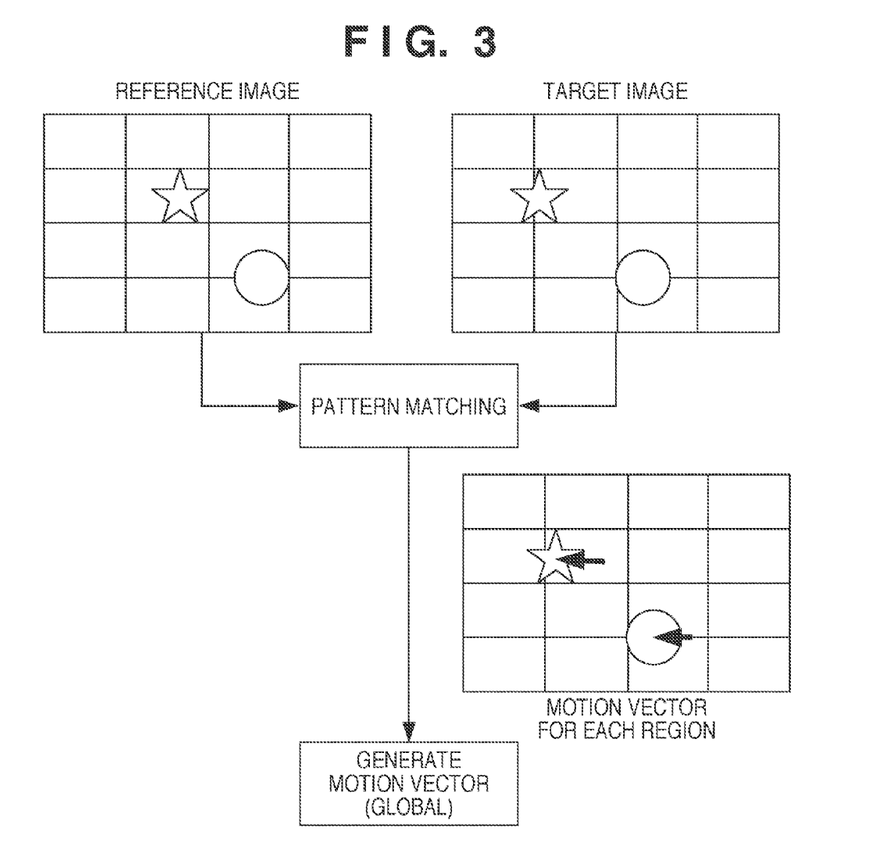
FIG. 3 is a diagram illustrating a method for detecting a motion vector.

A motion vector detection unit 108 is a block that sets one of a plurality of images stored in the RAM 103 as a reference image, and with respect to each of the other images excluding the reference image, detects a motion vector that represents the direction and the extent of displacement of the image with respect to the reference image. Specifically, out of the plurality of images stored in the RAM 103, the reference image and a target image to be compared with the reference image are input to the motion vector detection unit 108. Then, as shown in FIG. 3, each image is divided into a plurality of regions, pattern matching of an object image is performed for each region, and a motion vector for each region is detected. Furthermore, the motion vector detection unit 108 calculates a motion vector (global motion vector) of the entire target image based on the motion vector detected for each region. This motion vector for the entire target image is used for deciding the correction amount of the target image in a combining unit 109 to be described below. Note that the information of the motion vector of a target image detected by the motion vector detection unit 108 may be stored in the RAM 103 in association with the target image, for example.

Note that the present embodiment is described below assuming that the image that is captured first in a plurality of images stored in the RAM 103, for example, is used as the reference image serving as a reference for calculating motion vectors. However, the present invention is not limited to this, and it is sufficient if the reference image is one of the plurality of captured images. For example, the reference image may be decided based on the time of capturing, or the condition of an object image that is captured, for example.

The reference image and the target image are input to the combining unit 109, and the combining unit 109 moves the target image with respect to the reference image by an scalar amount of the motion vector detected by the motion vector detection unit 108 in the opposite direction to the motion vector, and combines the images. Note that in the present embodiment, it is assumed that the combining unit 109 includes an internal memory, for example, and images being combined are stored in the internal memory. A recording medium 110 may be, for example, an internal memory included in the digital camera 100, or a recording device detachably connected to the digital camera 100, such as a memory card or HDD. The combined image in which displacement between images has been corrected by the combining unit 109 is input to the recording medium 110 from the combining unit 109, and recorded.

Camera Shake Correction Processing

Figure 2:
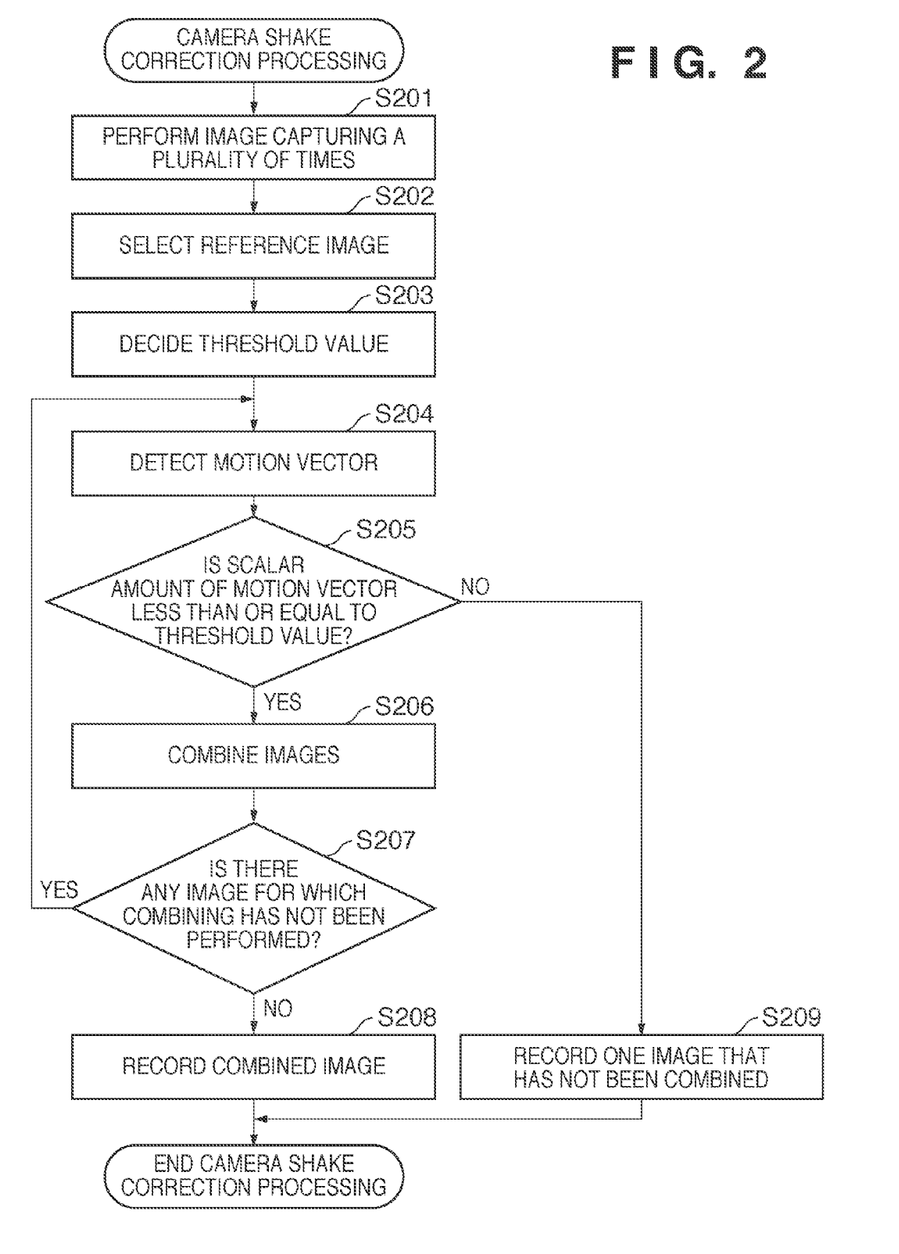
FIG. 2 is a flowchart illustrating camera shake correction processing according to an embodiment of the invention.

The camera shake correction processing of the digital camera 100 of the present embodiment configured as described above will be described specifically with reference to the flowchart in FIG. 2. The processing corresponding to the flowchart can be realized by the control unit 101 reading out a corresponding processing program stored in the ROM 102, expanding the program in the RAM 103, and executing the program, for example. Note that the following description is made on the assumption that the camera shake correction processing is started when image capturing is performed in the state where the user has set the image-capturing setting of the digital camera 100 to a setting that uses electronic camera shake correction, for example.

In step S201, the control unit 101 captures images a plurality of times, and causes the images obtained in each instance of image capturing to be stored in the RAM 103. Then, the control unit 101 advances the processing to step S202 when the plurality of times of image capturing have ended, and selects, as the reference image, the image that has been captured first out of the plurality of images stored in the RAM 103.

In step S203, the control unit 101 decides a threshold for determining whether each of the plurality of captured images excluding the reference image is to be combined with the reference image. Specifically, the control unit 101 decides the threshold for the scalar amount of the motion vector with respect to the reference image that is detected for each image, the threshold representing an image displacement limit for combining an image with the reference image.

In the present invention, in order to prevent the occurrence of a double image in the combined image obtained by correcting displacement between images as described above, different threshold values are set depending on the image-capturing settings set when the plurality of images are captured, the condition of an object image in the plurality of captured images, or the like. Specifically, the control unit 101 controls the threshold value representing an image displacement limit for combining an image with the reference image according to the likelihood of the occurrence of a double image, thereby preventing the occurrence of a double image and obtaining a combined image in which displacement between images has been accurately corrected.

Threshold Value for Image Displacement for Combining an Image with the Reference Image In the present embodiment, the control unit 101 controls the threshold value representing an image displacement limit for combining an image with the reference image according to at least one of the following six conditions.

1. Sensitivity

The control unit 101 changes the threshold value according to the setting value of the sensitivity setting of the digital camera 100 set when the plurality of images are captured. With a general image-capturing apparatus, since noise occurs in the image captured when the sensitivity setting is set to a high value (high-sensitivity image capturing), the edge contrast of the object image is low. In contrast, when an image is captured with the sensitivity setting being set to a low value, the obtained image has little noise. Also, with a conventional image-capturing apparatus, the image obtained by low-sensitivity image capturing is often subjected to edge emphasizing processing in order to improve the perceived resolution, and thus the image captured with the sensitivity setting being set to a low value has a high edge contrast of the object image.

That is, in the image having a high edge contract of the object image, the double image is highly noticeable in the case where the displacement amount of the object image has been erroneously detected, and thus it is necessary to set a low threshold value when the sensitivity setting is set to a low value. In contrast, in the image having a low edge contract of the object image, the double image is not noticeable even if images for which the displacement amount of the object image has been erroneously detected are combined, and thus a high threshold value may be set when the sensitivity setting is set to a high value. In other words, the control unit 101 performs control such that the threshold value is set to be smaller, as the setting value of the sensitivity setting set when a plurality of images are captured is smaller.

2. Number of Images to be Combined

The control unit 101 changes the threshold value according to the number of the plurality of captured images. As described above, in the case where the number of images to be combined for correcting displacement between images is small, the signal intensity such as luminance of each image to be combined is high. That is, if images for which the displacement amount of the object image has been erroneously detected are combined, a double image caused by the images is highly noticeable, and thus it is necessary to set a low threshold value in the case where the number of the images to be combined is small. In contrast, in the case where the number of images to be combined is large, even if images for which the displacement amount of the object image has been erroneously detected are combined, the signal intensity of each image is low and thus a double image is not noticeable. Therefore, a high threshold value can be set. That is, the control unit 101 performs control such that the threshold value is set to be smaller as the number of the images to be combined is smaller.

3. Shooting Mode

The control unit 101 changes the threshold value in the case where the shooting mode of the digital camera 100 set when a plurality of image are captured is the landscape mode. In the case where the landscape mode is included as a shooting mode in a general image-capturing apparatus, it is assumed in the landscape mode that images of an outdoor environment where a certain level of luminance is assured are captured, and thus the focal length is set to infinity. Therefore, the image captured in the landscape mode is required to have a high perceived resolution in order to reproduce distant objects, and thus is often subjected to processing for emphasizing the edge of object images.

In other words, the object image has a high edge contrast in the image captured in the landscape mode, and thus if the displacement amount of the object image has been erroneously detected, a double image is highly noticeable. That is, the control unit 101 performs control such that in the case where the shooting mode set when a plurality of images are captured is the landscape mode, the threshold value is set to be lower than a threshold value set in a case where a shooting mode other than the landscape mode is set.

4. Distance to Object

Figure 4B:
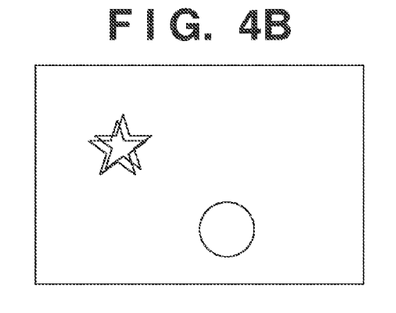

The control unit 101 changes the threshold value according to the distance between the object and the digital camera 100 when a plurality of images are captured. In the case where objects whose respective distances to the image-capturing apparatus are mutually different are present in the field of view, which is the range to be captured, if camera shake occurs, the displacement amounts of the object images in the captured image are mutually different. In particular, such a phenomenon in which the displacement amounts of the object images are mutually different prominently occurs when the distance between the objects and the image-capturing apparatus is short (macro shooting or the like). In short, even if such images are combined, displacement of some of the object images cannot be corrected, as shown in FIG. 4B, and a double image is likely to occur.

However, in the case of image capturing in which images are blurred as a result of deviation from the focal length, as in the macro shooting, although a double image is noticeable for a focused object image, the double image is not noticeable for the image of an object in a position that deviates from the focal length. In short, the control unit 101 performs control such that a low threshold value is set for the scalar amount of the motion vector detected in a region in the image where the image of an object that is located in a position close to the focal length when a plurality of images are captured is present.

5. Presence of Image of Person

The control unit 101 changes the threshold value depending on whether an image of a person is present in a plurality of captured images. In the case where the image of an object that does not always remain still such as a person is present in a captured image, the detected motion vector is considered to have a low reliability. That is, although the main object of the captured image is a person, if displacement between images are corrected according to the motion vector detected for the image of the person and the images are combined, the background images may be displaced from each other. That is, the control unit 101 performs control such that in the case where it is determined that a person is present in the plurality of captured images, a low threshold value is set such that only images for which a small motion vector has been detected, or in other words, images for which it is possible to consider that the person captured therein remains still, are combined.

6. Image Height

The control unit 101 detects a motion vector for each region in the captured image, and changes the threshold value for each region according to the position of each region in the image. Generally, the person who captures an image tends to capture an image such that the main object is located in the center of the image. In other words, a double image is noticeable in the case where it occurs in a region in the captured image having a low image height, where it is highly likely that the main object is present. In contrast, in the case where a double image occurs in a region having a high image height, since it is considered that the viewer of the image does not have much attention to that region, it is possible to consider that a double image will not be noticeable even if it occurs in that region. That is, the control unit 101 performs control such that the threshold value is set to be smaller, as the image height at a position of a region in the captured image is lower.

In this manner, in the present embodiment, the control unit 101 decides in step S203 the threshold value for the scalar amount of the motion vector detected for each image with respect to the reference image, the threshold representing an image displacement limit for combining an image with the reference image. Note that an appropriate combination of the above-described six conditions may be selected depending on the captured image.

In step S204 onward, the control unit 101 sequentially selects, from the plurality of images stored in the RAM 103 excluding the image that is selected as the reference image in step S202, one image at a time as the target image, and processes the selected image.

In step S204, the control unit 101 reads out the reference image and the target image from the RAM 103, outputs the images to the motion vector detection unit 108, and causes the motion vector of the target image to be detected. At this time, the control unit 101 causes the motion vector of the target image detected by the motion vector detection unit 108 to be stored in the RAM 103 in association with the target image.

In step S205, the control unit 101 determines whether the scalar amount of the motion vector detected for the target image exceeds the threshold representing an image displacement limit for combining an image with the reference image, which has been decided in step S203. If the scalar amount of the detected motion vector of the target image exceeds the threshold value, the control unit 101 advances the processing to step S209, and if the scalar amount is less than or equal to the threshold value, it advances the processing to step S206.

In step S206, the control unit 101 outputs the target image to the combining unit 109, corrects the displacement of the target image by the motion vector detected for the target image, and combines the target image with the reference image. Specifically, the control unit 101 moves, with respect to the reference image, the target image by the scalar amount of the motion vector detected for the target image in the direction opposite to the motion vector, and combines the target image with the reference image. Note that although the reference image and the target image are combined in the description of the processing in step S206, in the case where the number of the plurality of captured images is two or more, when the processing is advanced to step S206, a combined image stored in the internal memory of the combining unit 109 and the target image are combined.

In step S207, the control unit 101 determines whether there remains an image in the RAM 103 for which determination as to whether the condition for combining an image with the reference image is satisfied has not been made. If there remains such an image, the control unit 101 returns the processing to step S204. Also, if combining with the reference image has been performed for all images, the control unit 101 advances the processing to step S208 and encodes the image combined by the combining unit 109 with an encoding unit that is not shown in the drawings, records the encoded image in the recording medium 110, and ends the camera shake correction processing.

If it is determined in step S205 that the scalar amount of the detected motion vector of the target image exceeds the threshold value, the control unit 101 selects in step S209 one image that has not been combined out of the images stored in the RAM 103, for example. Then, the control unit 101 encodes the selected image with the encoding unit that is not shown in the drawings, records the encoded image in the recording medium 110, and ends the camera shake correction processing. Note that in step S209, the reference image may be selected in the case where no combining processing has been performed by the combining unit 109, for example.

As described above, with the image processing apparatus of the present embodiment, it is possible to obtain an image in which, by using a plurality of images, displacement between the images has been accurately corrected. Specifically, the image processing apparatus sets one of a plurality of obtained images as the reference image, and detects the motion vector for the other images with respect to the reference image. Then, the scalar amount of the detected motion vector is compared with the threshold value representing an image displacement limit for combining an image with the reference image, and determination as to whether the condition for combining an image with the reference image is satisfied is made. If the condition for combining an image with the reference image is satisfied, the corresponding image is moved so as to cancel the motion vector detected therefor and combined with the reference image, and an image in which displacement between the images has been corrected is output. Note that the threshold value representing an image displacement limit for combining an image with the reference image is changed by a control unit depending on the image-capturing settings set when the plurality of images are captured, the condition of an object image in the plurality of captured images, or the like.

In this manner, it is possible to prevent the occurrence of a double image in an image in which, by using a plurality of images, displacement between the images has been corrected, and obtain an image in which displacement has been favorably corrected.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-165345, filed Jul. 22, 2010, which is hereby incorporated by reference herein in its entirety.

What is claimed is:

1. An image sensing apparatus comprising:
an image sensor configured to generate analog image signals by photo-electrically converting an optical image;
an A/D convertor configured to convert the analog image signals generated by said image sensor to digital image data;
a memory configured to be connected to said A/D convertor and store the digital image data;
a motion vector detection unit configured to be connected to said memory, where said motion vector detection unit reads out, from said memory, a plurality of the digital image data obtained by performing a plurality of image sensing operations and calculates motion vectors by performing matching process between a reference digital image data and other digital image data excluding the reference digital image data which are among the plurality of the digital image data;

a combining unit configured to be connected to said memory, where said combining unit combines the plurality of the digital image data read out from said memory; and a CPU configured to be connected to said motion vector detection unit and said combining unit and control them, wherein said CPU set a threshold value based on a sensitivity which is set to said image sensor and causes said combining unit to combine the reference digital image data and the other digital image data in which a scalar amount of the motion vector, detected by said motion vector detection unit, is not higher than the threshold value.

2. The apparatus according to claim 1, wherein said CPU sets the threshold value to be smaller as the setting value of the sensitivity set to said image sensor is smaller.

3. An image sensing apparatus comprising:
an image sensor configured to generate analog image signals by photo-electrically converting an optical image;
an A/D convertor configured to convert the analog image signals generated by said image sensor to digital image data;
a memory configured to be connected to said A/D convertor and store the digital image data;
a motion vector detection unit configured to be connected to said memory, where said motion vector detection unit reads out, from said memory, a plurality of the digital image data obtained by performing a plurality of image sensing operations and calculates motion vectors by performing matching process between a reference digital image data and other digital image data excluding the reference digital image data which are among the plurality of the digital image data;
a combining unit configured to be connected to said memory, where said combining unit combines the plurality of the digital image data read out from said memory; and
a CPU configured to be connected to said motion vector detection unit and said combining unit and control them,
wherein said CPU set a threshold value based on the number of the plurality of the digital image data obtained by the plurality of image sensing operations, and causes said combining unit to combine the reference digital image data and the other digital image data in which a scalar amount of the motion vector, detected by said motion vector detection unit, is not higher than the threshold value.

4. The apparatus according to claim 3, wherein said CPU sets the threshold value to be smaller as the number of the plurality of the digital image data obtained by the plurality of the image sensing operations is smaller.

5. An image sensing apparatus comprising:
an image sensor configured to generate analog image signals by photo-electrically converting an optical image;
an A/D convertor configured to convert the analog image signals generated by said image sensor to digital image data;
a memory configured to be connected to said A/D convertor and store the digital image data;
a motion vector detection unit configured to be connected to said memory, where said motion vector detection unit reads out, from said memory, a plurality of the digital image data obtained by performing a plurality of image sensing operations and calculates motion vectors by performing matching process between a reference digital image data and other digital image data excluding the reference digital image data which are among the plurality of the digital image data;
a combining unit configured to be connected to said memory, where said combining unit combines the plurality of the digital image data read out from said memory; and
a CPU configured to be connected to said motion vector detection unit and said combining unit and control them,
wherein said CPU set a threshold value based on a shooting mode which is set to said image sensor, and causes said combining unit to combine the reference digital image data and the other digital image data in which a scalar amount of the motion vector, detected by said motion vector detection unit, is not higher than the threshold value.

6. The apparatus according to claim 5, wherein, in a case where a landscape mode is set to said image sensor, said CPU sets the threshold value to be smaller than a threshold value set in a case where a shooting mode other than the landscape mode is set to said image sensor.

7. An image sensing apparatus comprising:
an image sensor configured to generate analog image signals by photo-electrically converting an optical image;
an A/D convertor configured to convert the analog image signals generated by said image sensor to digital image data;
a memory configured to be connected to said A/D convertor and store the digital image data;
a motion vector detection unit configured to be connected to said memory, where said motion vector detection unit reads out, from said memory, a plurality of the digital image data obtained by performing a plurality of image sensing operations and calculates motion vectors by performing matching process between a reference digital image data and other digital image data excluding the reference digital image data which are among the plurality of the digital image data;
a combining unit configured to be connected to said memory, where said combining unit combines the plurality of the digital image data read out from said memory; and
a CPU configured to be connected to said motion vector detection unit and said combining unit and control them,
wherein said CPU set a threshold value for each of the plurality of the digital image data based on the distance between objects included in the image data and the image sensing apparatus, and causes said combining unit to combine the reference digital image data and the other digital image data in which a scalar amount of the motion vector, detected by said motion vector detection unit, is not higher than the threshold value.

8. The apparatus according to claim 7, wherein said CPU sets the threshold value to be smaller as the distance between the objects and the image sensing apparatus is shorter.

9. An image sensing apparatus comprising:
an image sensor configured to generate analog image signals by photo-electrically converting an optical image;
an A/D convertor configured to convert the analog image signals generated by said image sensor to digital image data;
a memory configured to be connected to said A/D convertor and store the digital image data;

a motion vector detection unit configured to be connected to said memory, where said motion vector detection unit reads out, from said memory, a plurality of the digital image data obtained by performing a plurality of image sensing operations and calculates motion vectors by performing matching process between a reference digital image data and other digital image data excluding the reference digital image data which are among the plurality of the digital image data;

a combining unit configured to be connected to said memory, where said combining unit combines the plurality of the digital image data read out from said memory; and a CPU configured to be connected to said motion vector detection unit and said combining unit and control them, wherein said CPU set a threshold value for each of the plurality of the digital image data based on whether the image data includes an image of a person, and causes said combining unit to combine the reference digital image data and the other digital image data in which a scalar amount of the motion vector, detected by said motion vector detection unit, is not higher than the threshold value.

10. The apparatus according to claim 9, wherein, in a case where the image data includes an image of a person, said CPU sets the threshold value to be smaller than a threshold value set in a case where the image data does not include an image of a person.

11. An image sensing apparatus comprising:

an image sensor configured to generate analog image signals by photo-electrically converting an optical image;

an A/D convertor configured to convert the analog image signals generated by said image sensor to digital image data;

a memory configured to be connected to said A/D convertor and store the digital image data;

a motion vector detection unit configured to be connected to said memory, where said motion vector detection unit reads out, from said memory, a plurality of the digital image data obtained by performing a plurality of image sensing operations and calculates motion vectors by performing matching process between a reference digital image data and other digital image data excluding the reference digital image data which are among the plurality of the digital image data;

a combining unit configured to be connected to said memory, where said combining unit combines the plurality of the digital image data read out from said memory; and a CPU configured to be connected to said motion vector detection unit and said combining unit and control them, wherein said CPU set a threshold value for each region in each of the plurality of the digital image data based on the image height that the region has, and causes said combining unit to combine the reference digital image data and the other digital image data in which a scalar amount of the motion vector, detected by said motion vector detection unit, is not higher than the threshold value.

12. The apparatus according to claim 11, wherein said CPU sets the threshold value of a region to be smaller as the image height of the region is lower.

13. An image sensing apparatus comprising:

an image sensor configured to generate analog image signals by photo-electrically converting an optical image;

an A/D convertor configured to convert the analog image signals generated by said image sensor to digital image data;

a memory configured to be connected to said A/D convertor and store the digital image data;

a motion vector detection unit configured to be connected to said memory, where said motion vector detection unit reads out, from said memory, a plurality of the digital image data obtained by performing a plurality of image sensing operations and calculates motion vectors by performing matching process between a reference digital image data and other digital image data excluding the reference digital image data which are among the plurality of the digital image data;

a combining unit configured to be connected to said memory, where said combining unit combines the plurality of the digital image data read out from said memory; and a CPU configured to be connected to said motion vector detection unit and said combining unit and control them, wherein, in a case where there is more than one digital image data excluding the reference image data as the other digital image data and the scalar amounts of the motion vectors detected by said motion vector detection unit for all of the other digital image data are not more than a threshold, said CPU causes said combining unit to combine the reference digital image data and the plurality of the other digital image data and to output a combined digital image data, and wherein, in a case where there is more than one digital image data excluding the reference image data as the other digital image data and there is a digital image data among the plurality of the other digital image data in which the scalar amount of the motion vector detected by said motion vector detection unit for the digital image data are higher than the threshold, said CPU outputs one of the plurality of the digital image data obtained by the a plurality of the image sensing operations even though there is a digital image data among the plurality of the other digital image data in which the scalar amount of the motion vector detected by said motion vector detection unit is not more than the threshold.

14. The apparatus according to claim 13, wherein, in a case where there is more than one digital image data excluding the reference image data as the other digital image data and there is a digital image data among the plurality of the other digital image data in which the scalar amount of the motion vector detected by said motion vector detection unit for the digital image data are higher than the threshold, said CPU outputs the reference digital image data.

15. A method of controlling image sensing apparatus, which comprises an image sensor configured to generate analog image signals by photo-electrically converting an optical image, an A/D convertor configured to convert the analog image signals generated by said image sensor to digital image data, a memory configured to be connected to said A/D convertor and store the digital image data and a CPU, comprising:

setting a threshold value based on a sensitivity which is set to said image sensor;

causing a motion vector detection unit, which is connected to said memory, to read out, from said memory, a plurality of the digital image data obtained by performing a plurality of image sensing operations and to calculate motion vectors by performing matching process between a reference digital image data and other digital image data excluding the reference digital image data which are among the plurality of the digital image data; and causing a combining unit, which is connected to said memory, to combine the reference digital image data and the other digital image data in which a scalar amount of the motion vector, detected by said motion vector detection unit, is not higher than the threshold value, wherein the method is executed by said CPU.

16. A method of controlling image sensing apparatus, which comprises an image sensor configured to generate analog image signals by photo-electrically converting an optical image, an A/D convertor configured to convert the analog image signals generated by said image sensor to digital image data, a memory configured to be connected to said A/D convertor and store the digital image data and a CPU, comprising:

setting a threshold value based on the number of the plurality of the digital image data obtained by the plurality of image sensing operations;

causing a motion vector detection unit, which is connected to said memory, to read out, from said memory, a plurality of the digital image data obtained by performing a plurality of image sensing operations and to calculate motion vectors by performing matching process between a reference digital image data and other digital image data excluding the reference digital image data which are among the plurality of the digital image data; and causing a combining unit, which is connected to said memory, to combine the reference digital image data and the other digital image data in which a scalar amount of the motion vector, detected by said motion vector detection unit, is not higher than the threshold value, wherein the method is executed by said CPU.

17. A method of controlling image sensing apparatus, which comprises an image sensor configured to generate analog image signals by photo-electrically converting an optical image, an A/D convertor configured to convert the analog image signals generated by said image sensor to digital image data, a memory configured to be connected to said A/D convertor and store the digital image data and a CPU, comprising:

setting a threshold value based on a shooting mode which is set to said image sensor;

causing a motion vector detection unit, which is connected to said memory, to read out, from said memory, a plurality of the digital image data obtained by performing a plurality of image sensing operations and to calculate motion vectors by performing matching process between a reference digital image data and other digital image data excluding the reference digital image data which are among the plurality of the digital image data; and causing a combining unit, which is connected to said memory, to combine the reference digital image data and the other digital image data in which a scalar amount of the motion vector, detected by said motion vector detection unit, is not higher than the threshold value, wherein the method is executed by said CPU.

18. A method of controlling image sensing apparatus, which comprises an image sensor configured to generate analog image signals by photo-electrically converting an optical image, an A/D convertor configured to convert the analog image signals generated by said image sensor to digital image data, a memory configured to be connected to said A/D convertor and store the digital image data and a CPU, comprising:

setting a threshold value for each of the plurality of the digital image data based on the distance between objects included in the image data and the image sensing apparatus;

causing a motion vector detection unit, which is connected to said memory, to read out, from said memory, a plurality of the digital image data obtained by performing a plurality of image sensing operations and to calculate motion vectors by performing matching process between a reference digital image data and other digital image data excluding the reference digital image data which are among the plurality of the digital image data; and causing a combining unit, which is connected to said memory, to combine the reference digital image data and the other digital image data in which a scalar amount of the motion vector, detected by said motion vector detection unit, is not higher than the threshold value, wherein the method is executed by said CPU.

19. A method of controlling image sensing apparatus, which comprises an image sensor configured to generate analog image signals by photo-electrically converting an optical image, an A/D convertor configured to convert the analog image signals generated by said image sensor to digital image data, a memory configured to be connected to said A/D convertor and store the digital image data and a CPU, comprising:

setting a threshold value for each of the plurality of the digital image data based on whether the image data includes an image of a person;

causing a motion vector detection unit, which is connected to said memory, to read out, from said memory, a plurality of the digital image data obtained by performing a plurality of image sensing operations and to calculate motion vectors by performing matching process between a reference digital image data and other digital image data excluding the reference digital image data which are among the plurality of the digital image data; and causing a combining unit, which is connected to said memory, to combine the reference digital image data and the other digital image data in which a scalar amount of the motion vector, detected by said motion vector detection unit, is not higher than the threshold value, wherein the method is executed by said CPU.

20. A method of controlling image sensing apparatus, which comprises an image sensor configured to generate analog image signals by photo-electrically converting an optical image, an A/D convertor configured to convert the analog image signals generated by said image sensor to digital image data, a memory configured to be connected to said A/D convertor and store the digital image data and a CPU, comprising:

setting a threshold value for each region in each of the plurality of the digital image data based on the image height that the region has;

causing a motion vector detection unit, which is connected to said memory, to read out, from said memory, a plurality of the digital image data obtained by performing a plurality of image sensing operations and to calculate motion vectors by performing matching process between a reference digital image data and other digital image data excluding the reference digital image data which are among the plurality of the digital image data; and causing a combining unit, which is connected to said memory, to combine the reference digital image data and the other digital image data in which a scalar amount of the motion vector, detected by said motion vector detection unit, is not higher than the threshold value, wherein the method is executed by said CPU.

21. A method of controlling image sensing apparatus, which comprises an image sensor configured to generate analog image signals by photo-electrically converting an optical image, an A/D convertor configured to convert the analog image signals generated by said image sensor to digital image data, a memory configured to be connected to said A/D convertor and store the digital image data and a CPU, comprising:

causing a motion vector detection unit, which is connected to said memory, to read out, from said memory, a plurality of the digital image data obtained by performing a plurality of image sensing operations and to calculate motion vectors by performing matching process between a reference digital image data and other digital image data excluding the reference digital image data which are among the plurality of the digital image data; and causing said combining unit, in a case where there is more than one digital image data excluding the reference image data as the other digital image data and the scalar amounts of the motion vectors detected by said motion vector detection unit for all of the other digital image data are not more than a threshold, to combine the reference digital image data and the plurality of the other digital image data and to output a combined digital image data, and outputting, in a case where there is more than one digital image data excluding the reference image data as the other digital image data and there is a digital image data among the plurality of the other digital image data in which the scalar amount of the motion vector detected by said motion vector detection unit for the digital image data are higher than the threshold, one of the plurality of the digital image data obtained by the a plurality of the image sensing operations even though there is a digital image data among the plurality of the other digital image data in which the scalar amount of the motion vector detected by said motion vector detection unit is not more than the threshold, wherein the method is executed by said CPU.

* * * * *